(12) United States Patent
Yanagisaki et al.

(10) Patent No.: US 10,279,445 B2
(45) Date of Patent: May 7, 2019

(54) CONVEYANCE JIG FOR SEPARATE TYPE CONTROL PANEL (71) Applicant: FUJI CORPORATION, Chiryu-shi (JP)

(72) Inventors: Jun Yanagisaki, Toyota (JP); Osamu Nagai, Nagoya (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/559,866

(22) PCT Filed: Mar. 26, 2015

(86) PCT No.: PCT/JP2015/059356
§ 371 (c)(1),
(2) Date: Sep. 20, 2017

(87) PCT Pub. No.: WO2016/151836
PCT Pub. Date: Sep. 29, 2016

(65) Prior Publication Data
US 2018/0056462 A1  Mar. 1, 2018

(51) Int. Cl.
*B23Q 9/00* (2006.01)
*F16M 11/42* (2006.01)
(Continued)

(52) U.S. Cl.
CPC .............. *B23Q 1/40* (2013.01); *B23Q 1/0045* (2013.01); *B23Q 9/0078* (2013.01); *B23Q 41/04* (2013.01); *F16M 11/22* (2013.01); *F16M 11/42* (2013.01)

(58) Field of Classification Search
CPC .......... B23Q 1/40; B23Q 41/04; F16M 11/22; F16M 11/42
(Continued)

(56) References Cited

U.S. PATENT DOCUMENTS 3,977,662 A * 8/1976 Cook ..................... B25H 1/00
269/60
5,851,007 A * 12/1998 Swartzlander ....... B25H 1/0007
269/17
(Continued)

FOREIGN PATENT DOCUMENTS

JP      2002-370130 A      12/2002

OTHER PUBLICATIONS

International Search Report dated Jun. 16, 2015 in PCT/JP2015/059356 filed Mar. 26, 2015.

*Primary Examiner* — Muhammad Ijaz
(74) *Attorney, Agent, or Firm* — Oblon, McClelland, Maier & Neustadt, L.L.P.

(57) ABSTRACT

A conveyance jig provided for integrally conveying a separate type control panel with a machine tool that are disposed separately, includes a fixing section with respect to a base and a holding section that holds a separate type control panel in a state of being installed on a movable stand with casters at the rear of the base in order to integrally conveys a machine tool including the base and a processing module that is movably installed to be movable in the front-rear direction along a straight line rail provided on the base separately with a gap in a width direction, and the separate type control panel that is installed on the movable stand with casters and disposed separately from the machine tool.

3 Claims, 5 Drawing Sheets

(51) Int. Cl.
*B23Q 1/40* (2006.01)
*B23Q 41/04* (2006.01)
*F16M 11/22* (2006.01)
*B23Q 1/00* (2006.01)

(58) Field of Classification Search
USPC .... 248/129, 176.3, 544, 346.11; 269/1, 2, 3, 269/9, 60, 37, 38; 280/1.5, 7.1, 7.16
See application file for complete search history.

(56) References Cited

U.S. PATENT DOCUMENTS

| | | | | |
|---|---|---|---|---|
| 5,944,896 | A * | 8/1999 | Landesman | B05B 13/0285 |
| | | | | 118/500 |
| 7,429,035 | B2 * | 9/2008 | Metcalf | B66C 23/48 |
| | | | | 248/125.2 |
| 9,374,935 | B2 * | 6/2016 | Iwaki | H05K 13/04 |
| 2006/0022096 | A1 * | 2/2006 | Chan | A47B 23/046 |
| | | | | 248/129 |
| 2007/0107806 | A1 * | 5/2007 | Jesberger | B23D 47/025 |
| | | | | 144/286.5 |
| 2012/0145849 | A1 * | 6/2012 | Yeum | B25B 11/02 |
| | | | | 248/220.21 |
| 2013/0047392 | A1 * | 2/2013 | Iwaki | H05K 13/04 |
| | | | | 29/33 R |

* cited by examiner

CONVEYANCE JIG FOR SEPARATE TYPE CONTROL PANEL

TECHNICAL FIELD

The present invention relates to a conveyance jig for conveying a separate type control panel that is disposed separately from a machine tool integrally with the machine tool.

BACKGROUND ART

In conveyance work for loading a machine tool in a factory, lifting conveyance and the like of the machine tool are carried out using a crane. At that time, in addition to the machine tool being conveyed, a control panel or the like that is integrally configured with the machine tool is conveyed. Accordingly, preferably it is possible to simultaneously convey the machine tool and the control panel. In particular, if integral conveyance is possible, as well as separate conveyance work being unnecessary, disassembly work or assembly work are also unnecessary during factory delivery and during installation. Therefore, a configuration for integrally conveying is disclosed in PTL 1 below.

In the machine tool in the document, two processing modules lined up left and right are each installed on a left and right bed separately from each other. Then, a gantry loader composed of a portal frame that connects both of the left and right beds is configured on the left and right bed, and a control panel is installed in the portal frame. For conveyance of such a machine tool, left and right beds and a processed part, and a gantry loader composed of a portal frame must be separated, and wiring between the control panel and the processing section installed in the portal frame must be removed. Therefore, the document discloses a configuration in which the portal frame and left and right beds that would otherwise need to be conveyed separately are connected via a frame support jig for conveyance, and it is possible to integrally convey them.

CITATION LIST

Patent Literature

PTL 1: JP-A-2002-370130

SUMMARY OF INVENTION

Technical Problem

A frame support jig of the related art described above directly fixes each of the items that would otherwise have to be conveyed separately, and is subjected to lifting conveyance. Note that, since there are various types of machine tools, it is not possible for the machine tool that does not use a gantry loader to correspond to a frame support jig of the related art example above. That is, since the frame support jig of a hanging configuration is gantry loader specific, application is difficult to a machine tool with another structure. As well as a jig that directly fixes the items to be conveyed to each other by bolting and the like having a complex configuration due to a fixing structure to fasten both items being necessary, the jig has a problem in that it is not easy to handle due to a certain extent of dimensional precision and ability to fasten a heavy load being required.

Therefore, in order to solve the problem, the present invention has an object of providing a conveyance jig for a separate type control panel for conveying the separate type control panel integrally with a machine tool.

Solution to Problem

A conveyance jig for a separate type control panel according to an aspect of the invention is a conveyance jig for integrally conveying a machine tool including a base and a processing module that is installed to be movable in the front-rear direction along straight line rails provided on the base separately with a gap in a width direction, and a separate type control panel that is installed on a movable stand with casters and disposed separately from the machine tool, the conveyance jig including a fixing section with respect to the base and a holding section that holds the separate type control panel in a state of being installed on the movable stand with casters at the rear of the base.

Advantageous Effects of Invention

According to the conveyance jig of the present invention, a fixing section is fixed on the base of the machine tool on which a movable processing module is installed, the separate type control panel being held by the holding section in a state installed on the movable stand with casters at the rear of the base, thereby the separate type control panel is lifted up by the conveyance jig along with the movable stand with casters in a case where the base of the machine tool is lifted up by a crane or the like. Therefore, it is possible to convey the separate type control panel integrally with the machine tool even if the separate type control panel is disposed separately from the machine tool.

DESCRIPTION OF EMBODIMENTS

Figure 1:
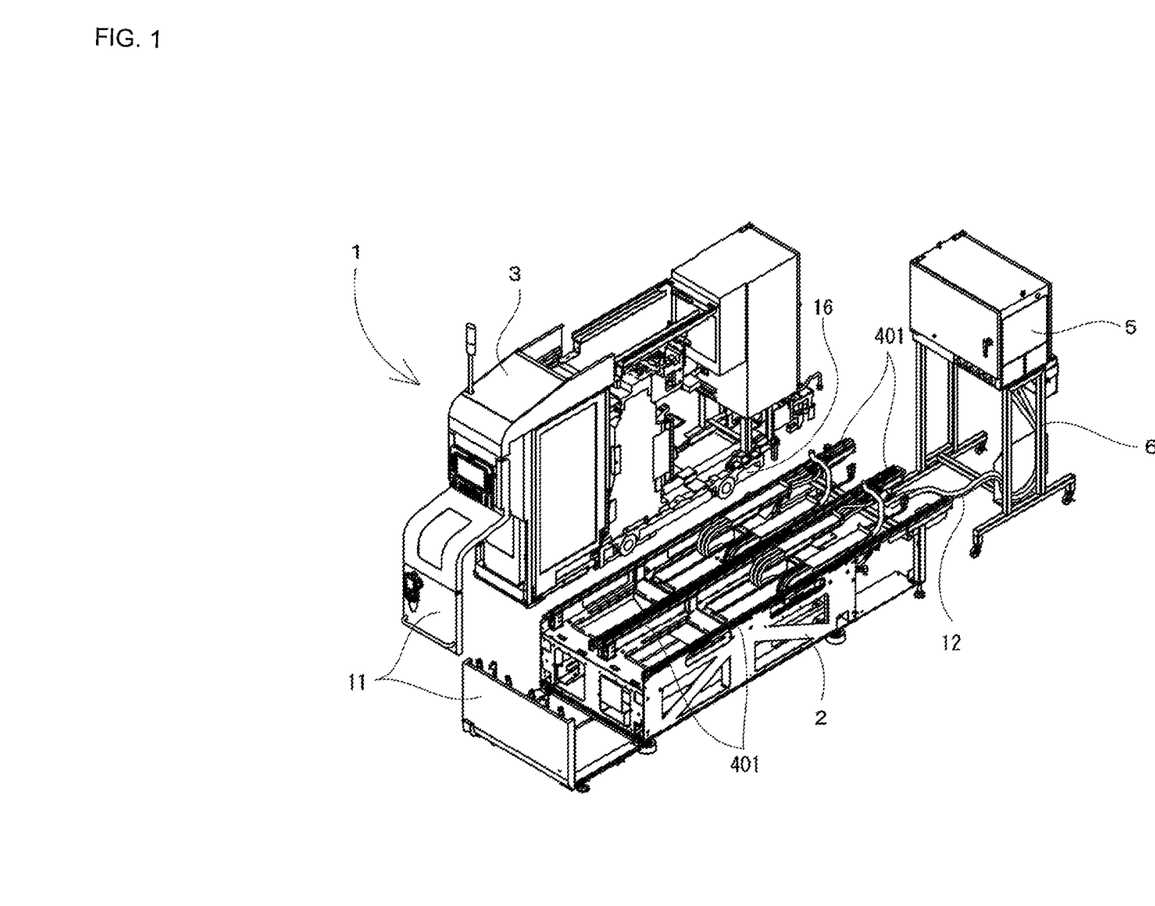
FIG. 1 is a perspective view illustrating a base, a processing module, and a control panel of the machine tool each in a separated state.
Figure 2:
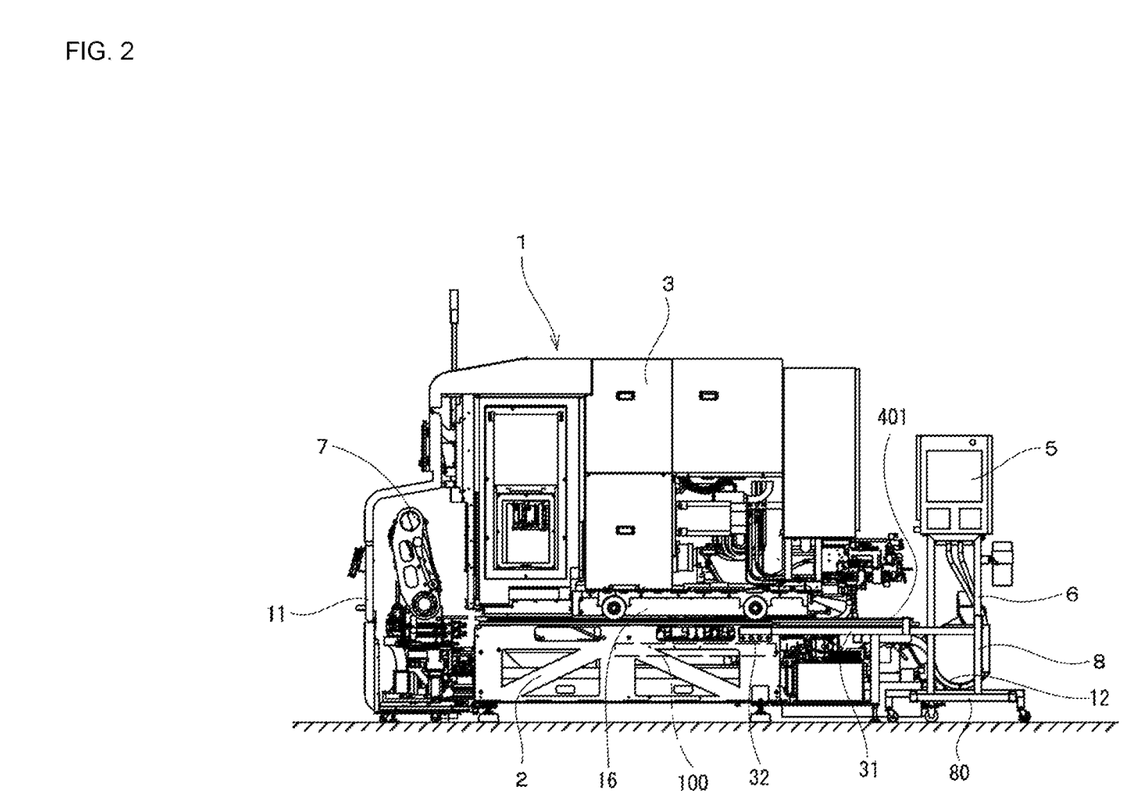
FIG. 2 is a side view illustrating a state prior to conveyance of the machine tool in which the processing module is installed on the base.

Next, a conveyance jig for a separate type control panel according to an embodiment of the present invention will be described below with reference to the drawings. FIG. 1 is a perspective view illustrating illustrating base 2, processing module 3, and control panel 5 of the machine tool each in a separated state. Processing module 3 is shown in a state in which a part of an exterior cover is removed, and furthermore, only one of the two processing modules 3 that is installable on base 2 is shown. FIG. 2 is a side view illustrating a state prior to conveyance of the machine tool in which the processing module is installed on the base. In machine tool 1 of the present embodiment, processing module 3 is installed on base 2, and control panel 5 is installed on movable stand 6 with casters so as to be separated from machine tool 1.

Straight line rails 401 separated with a gap in a width direction are fixed on base 2 in the front-rear direction. Four rails 401 are fixed on base 2 on which it is possible to install two processing modules 3. Also, processing modules 3 that form a machine tool main body are configured on movable bed 16 that is provided with wheels so that it is possible to move on base 2 in the front-rear direction along rails 401. A turret device that is provided with a main spindle stand or a tool that grasps a workpiece, a driving device that moves the turret device in the Z-axis and X-axis directions, a control device, and the like are installed on movable bed 16. Consequently, in machine tool 1, a tool is selected by revolving and indexing the turret device, positioning of the tool is carried out by driving an X-axis driving device and a Z-axis driving device, and cutting processing and the like are carried out on the workpiece that is rotated by driving of the main spindle.

In addition, machine tool 1 is provided with workpiece conveyance device 7. Workpiece conveyance device 7 performs delivery of the workpiece between each processing module 3, and is installed inside front cover 11 that is formed at the front of machine tool 1. A single space that is continuous in the width direction of base 2 is formed by front cover 11, and workpiece conveyance device 7 that is provided with a robot arm in the space is attached to base 2 to be able to run. Workpiece conveyance device 7 performs delivery of the workpiece between multiple processing modules 3.

Further, control panel 5 for communicating with a power supply of processing module 3 or workpiece conveyance device 7 is provided in machine tool 1. FIG. 1 indicates only one base 2, but a processing machine line is configured by multiple machine tools 1 lined up in the width direction by closely arranging multiple bases 2 in the width direction and installing two processing modules 3 on each base 2.

In the present embodiment, control panel 5 in the processing line is installed on every base 2, that is, on every two processing modules 3. Accordingly, if the number of processing modules 3 on base 2 increases to two or more, the number of control panels 5 increases to two or three. Any control panel 5 can be installed on movable stand 6 with casters, and is disposed at the rear of machine tool 1. Also, wiring 12 extends from control panel 5 in order to drive processing modules 3. For example, wiring 12 is a power cable for driving a servomotor for the main spindle and a servomotor for the X-axis and Z-axis driving devices, a communication cable that exchanges a signal for performing driving control, or the like.

Control panel 5 is disposed at a rear fixed position during operation of machine tool 1, but control panel 5 retreats to the rear by movement of movable stand 6 in the state with control panel 5 connected to wiring 12, because control panel 5 disturbs maintenance work when maintenance is performed at the rear side. As described above, improvement of maintenance is achieved by configuring control panel 5 to be movable since a rear section space is narrow in the processing machine line in which machine tools 1 are closely disposed in the width direction. However, there is a problem in that control panel 5 is a separate type that is separated from machine tool 1, and it is not possible to lift up control panel 5 simultaneously using the crane when conveying machine tool 1.

That is, it is possible for processing modules 3 that are installed on base 2 to be lifted up integrally using the crane, but control panel 5 must be lifted up and conveyed separately. Additionally, wiring 12 that is connected between control panel 5 and processing modules 3 must be temporarily disconnected. That is, in order to lift up and convey only the control panel 5 using the crane, attachment and detachment work and the like of wiring 12 is necessary in order to completely separate from machine tool 1. Consequently, preferably it is possible to convey control panel 5 integrally with machine tool 1 in a state with control panel 5 connected thereto.

Therefore, in order to do so, it is conceivable that a conveyance table that is attachable to and detachable from base 2 be fixed to base 2 during conveyance, control panel 5 be installed on the conveyance table in a state with control panel 5 connected to wiring 12, and base 2, processing module 3, and control panel 5 be integrally conveyed. It is considered that attachment location 100 and the like, for example, that is indicated by a broken line in FIG. 2 is appropriate as an attachment position of the conveyance table on which control panel 5 is installed. However, in the concept, to install or uninstall control panel 5 on the conveyance table it is necessary to move by lifting up control panel 5 using the crane only for that purpose. In addition, in a state in which control panel 5 is attached to one side of machine tool 1 in the width direction, balance is not good during lifting conveyance by the crane. Furthermore, a protruding part of control panel 5 that protrudes to the side of machine tool 1 becomes a hindrance during conveyance.

Figure 3:
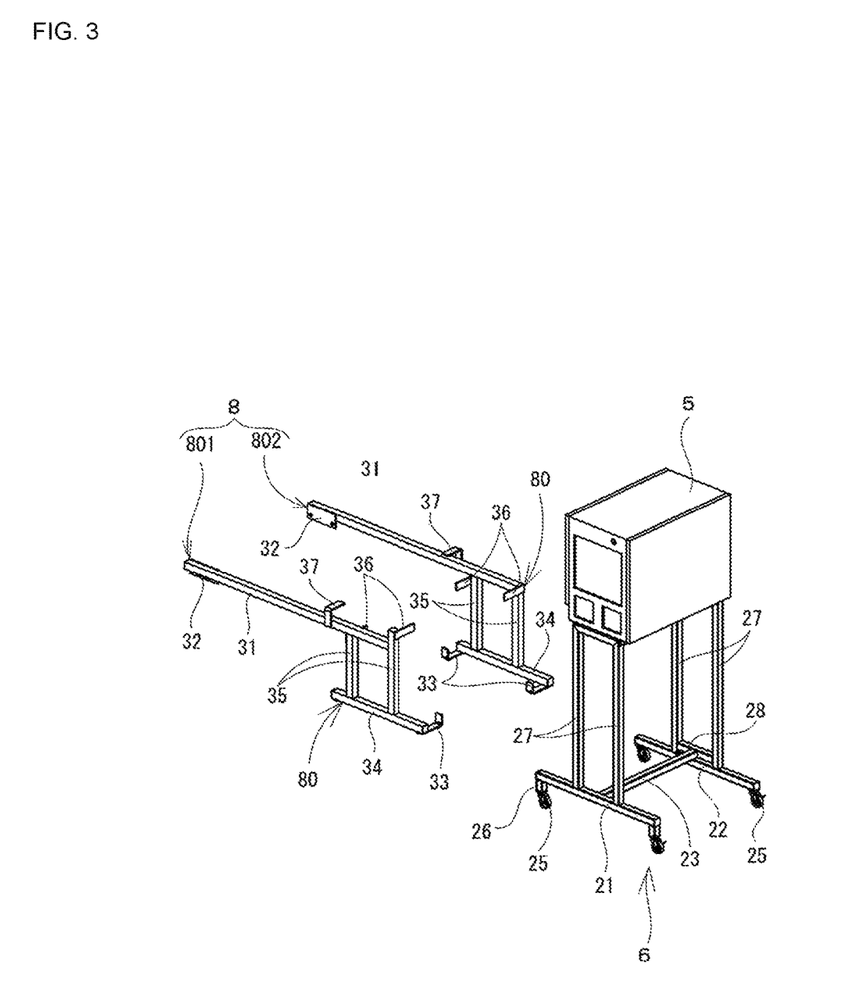
FIG. 3 is a perspective view prior to attachment that indicates a relationship between a conveyance jig and a separate type control panel of the present embodiment.
Figure 4:
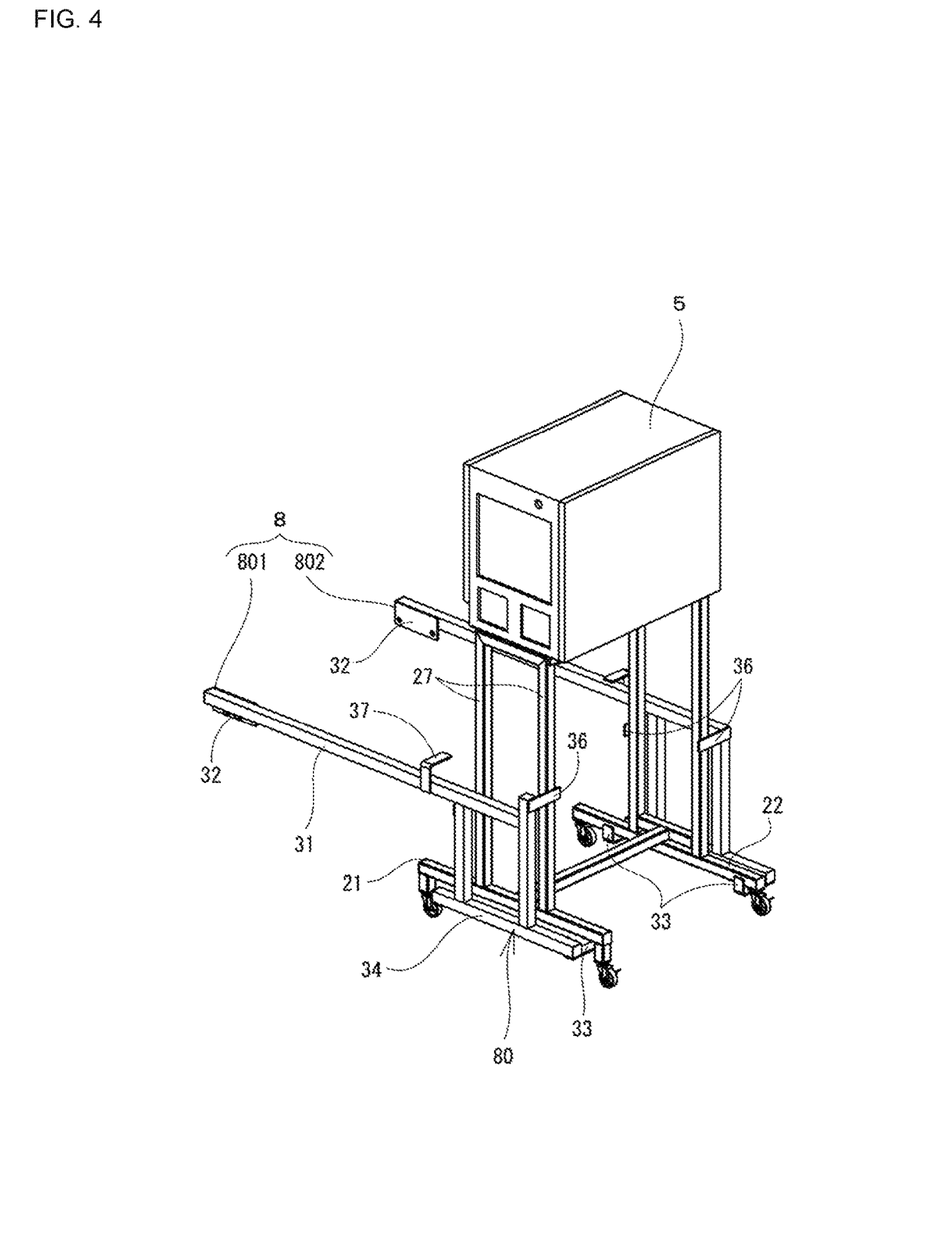
FIG. 4 is a perspective view after attachment that indicates the relationship between the conveyance jig and the separate type control panel of the present embodiment.

Therefore, the present embodiment suggests a conveyance jig for conveying integrally with machine tool 1 control panel 5 of a separate type that is separate from machine tool 1. In this arrangement, FIG. 3 and FIG. 4 are perspective views that illustrate control panel 5 that is installed on movable stand 6 and conveyance jig 8 that holds control panel 5 on the base 2 side. In particular, FIG. 3 indicates the relationship prior to conveyance, and FIG. 4 indicates the relationship after conveyance. Conveyance jig 8 is for conveying integrally with machine tool 1 control panel 5 of a separate type. In particular, control panel 5 is installed in a state of being fixed to movable stand 6, and conveyance jig 8 holds movable stand 6. Therefore, first, movable stand 6 with casters will be described.

Movable stand 6 is organized in a predetermined shape in which multiple members comprising a rectangular steel pipe are joined to each other. Specifically, left and right horizontal members 21 and 22 are disposed in parallel, and reinforcing member 23 is provided between horizontal members 21 and 22. Caster 25 is attached at both ends to the front and rear of horizontal members 21 and 22, and movement is possible in a state in which control panel 5 is supported by a total of four casters 25. In addition, caster 25 is attached to both ends of horizontal member 21 via auxiliary member 26, and horizontal member 21 is positioned higher than horizontal member 22. Therefore, horizontal reinforcing member 23 is directly joined to horizontal member 21, but is indirectly joined to horizontal member 22. Note that, the front-rear direction in the present embodiment is the front-rear direction of machine tool 1 that is the movement direction of processing module 3, and a direction which relates to movable stand 6 and conveyance jig 8 is a direction of a case of viewing in a state of being integrally lifted up with machine tool 1 as indicated in FIG. 2.

Horizontal members 21 and 22 are orthogonally joined to two leg members 27 respectively at the front and rear. Then, connecting member 28 that is parallel to horizontal member 22 is joined to the two leg members 27 that are joined to the horizontal member 22 side. Consequently, twisting of the long leg members 27 that may occur during movement is suppressed even in a movable stand 6 with a high center of gravity because the reinforcing member 23 is joined to the horizontal member 21 and the connecting member 28, and is joined at the left and right at a lower portion. A width gap between horizontal members 21 and 22 or the front and rear gap of each of the leg members 27 are designed to match the size of control panel 5. Further, on four leg members 27 disposed to stand up, a top plate is formed such that the upper end portions are joined, and it is possible to install in a state in which control panel 5 is fixed.

Next, conveyance jig 8 is designed with respect to such a movable stand 6. Conveyance jig 8 is configured by a pair of jig members 801 and 802 such that movable stand 6 is interposed from both sides in the width direction. Jig members 801 and 802 are formed in a substantially symmetrical shape, but have different dimensions to the member to match different heights of horizontal members 21 and 22 as described above. Except for the partial difference, jig members 801 and 802 have substantially matching shapes, therefore explanations hereafter which relate to jig members 801 and 802 are collectively described as conveyance jig 8.

Figure 5:
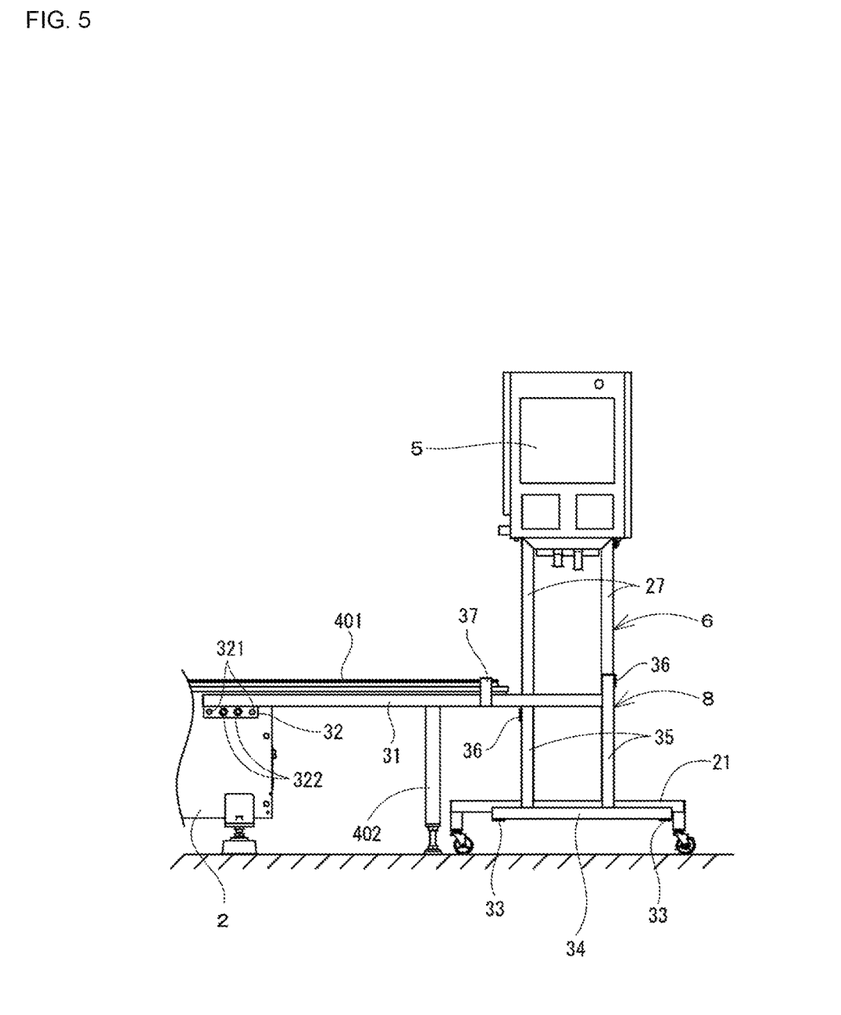
FIG. 5 is a side view after attachment that indicates the relationship between the conveyance jig and the separate type control panel of the present embodiment.

In this arrangement, FIG. 5 is a side view illustrating a state prior to lifting up in which control panel 5 and movable stand 6 are held by conveyance jig 8. Conveyance jig 8 of the present embodiment is fixed to base 2, and holds control panel 5 and movable stand 6. Therefore, the conveyance jig 8 has a fixing section for fixing to the base 2 and a holding section that holds the movable stand 6. The fixing section is plate shape bracket 32 that is joined to one end section of support beam 31 that is a rectangular steel pipe, and is fastened with bolts in screw holes that are formed on base 2. Accordingly, through-holes 321 through which the bolts pass at two front and rear locations are formed in bracket 32. Furthermore, two nuts 322 are joined to bracket 32 and are screwed on the bolts when the bolts are unused, and thereby are kept integrally with conveyance jig 8.

Next, as illustrated in FIG. 5, in a case where bracket 32 is fixed to base 2, support beam 31 is disposed to protrude horizontally at the rear side of machine tool 1. Also, holding section 80 is configured on the rear side end section of support beam 31. Holding section 80 is configured such that multiple members comprising a rectangular steel pipe are joined. Holding section 80 supports movable stand 6 from below, and is supported from the front and rear so as to prevent positional deviation in the front-rear direction. Therefore, first, holding plate 33 that supports the horizontal members 21 and 22 from below is joined to the end section at the front and the rear of horizontal support member 34.

Holding plate 33 is an L-shaped plate member, passes below the horizontal members 21 and 22 from an outside position in the width direction, and is bent upward at an inside position. A gap between holding plates 33 that are positioned at the front and rear is narrower than a gap between casters 25 that are positioned to the front and rear of each horizontal member 21 and 22. In addition, support member 34 that is provided with holding plate 33 is joined to two vertical members 35 that are joined so as to be orthogonal to support beam 31, and is disposed at a lower position than the horizontal members 21 and 22 during attachment. Accordingly, in conveyance jig 8 in the conveyance state indicated in FIG. 5, support beam 31 extends over a side face portion of an upper part of base 2 toward the rear, vertical member 35 is disposed along leg members 27, and support member 34 is disposed along horizontal members 21 and 22. At that time, holding plates 33 that are fixed to support member 34 have a gap between the lower faces of horizontal members 21 and 22.

In addition, two vertical members 35 that are positioned to the front and the rear are disposed with substantially the same gap between the two leg members 27 of movable stand 6, and support plates 36 are respectively joined. A pair of support plates 36 that are fixed to vertical member 35 and positioned to the front and rear are positioned so as to interpose the two leg members 27 that are positioned to the front and the rear from the outside in the front-rear direction. Note that, one vertical member 35 on the jig member 801 side is formed to be long, but this is to avoid a wiring cover that is not shown in the drawings. In addition, the height of support member 34 of jig member 801 corresponds to the position of horizontal member 21 of movable stand 6, and is positioned higher than support member 34 of jig member 802 that corresponds to horizontal member 22.

Note that, in conveyance jig 8, support beam 31 that is fixed using bracket 32 is a cantilever beam of one side fixed end. Accordingly, when control panel 5 is lifted up along with machine tool 1, a load such as control panel 5 acts as a moment with respect to support beam 31. At this time, the moment that acts on bracket 32 is increased and it is necessary for a fixed structure to be robust since the distance is from bracket 32 to control panel 5. In such a case, it is necessary to improve a sectional secondary moment with respect to support beam 31 that is a rectangular steel pipe. Accordingly, in conveyance jig 8, bracket 32 and support beam 31 are heavy and large, and conveyance jig 8 is difficult for an operator to handle.

Therefore, conveyance jig 8 of the present embodiment does not only have a fixed support point by bracket 32, but is provided with intermediate support plate 37 that receives a load of control panel 5 and the like along support beam 31 as the intermediate support point. Intermediate support plate 37 is an L-shaped plate member, is joined to the side face of support beam 31, and is horizontally bent in a width direction inside direction extending upward. As illustrated in FIG. 5, intermediate support plate 37 is hooked on rail 401 of base 2 from above, and a load of control panel 5 and the like is configured to act on rail 401. Rail 401 has higher rigidity than support beam 31, horizontally protrudes at the rear of base 2, and is supported by support column 402, such that a horizontal state is maintained. Intermediate support plate 37 is hooked further to the tip end side (rear side) of rail 401 than support column 402. The load is received at a position closer than holding plate 33 that directly holds movable stand 6.

Accordingly, according to the present embodiment, in a case where separate type control panel 5 is conveyed and lifted up integrally with machine tool 1, holding plate 33 and support plate 36 of the pair of jig members 801 and 802 that are conveyance jigs 8 are disposed at a predetermined position with respect to movable stand 6 by the operator, and subsequently, intermediate support plate 37 is hooked on rail 401. After that, a bolt that is screwed on nut 322 of bracket 32 is removed, bracket 32 is fastened to base 2 using the bolt, and thereby, as indicated in FIG. 2, the conveyance jig 8 is attached between machine tool 1 and control panel 5 (movable stand 6).

After that, when machine tool 1 is lifted up by the crane, control panel 5 and movable stand 6 are lifted by conveyance jig 8. That is, holding plate 33 lifts movable stand 6 so as to scoop up the horizontal members 21 and 22 by conveyance jig 8 raising according to base 2. The lifted movable stand 6 is stable in a state in which displacement in the front-rear direction is prevented since support plate 36 is interposed by two leg members 27 from the front and rear.

In addition, the load of control panel 5 and the like acts on the rail 401 side via intermediate support plate 37.

Therefore, in the state indicated in FIG. 2, machine tool 1 and control panel 5 are integrally lifted up. Also, after being conveyed and installed at a predetermined position, the bolt of bracket 32 is loosened and conveyance jig 8 is removed from base 2, and removed from movable stand 6. The pulled out bolt is screwed on nut 322 of bracket 32, and conveyance jig 8 composed of the pair of jig members 801 and 802 is kept at a storage location.

According to conveyance jig 8 of the present embodiment above, machine tool 1 in which processing modules 3 are mounted on base 2 and control panel 5 of a separate type from machine tool 1 that is installed on movable stand 6 are integrally lifted up by the crane or the like, and conveyance is possible. Moreover, in an installed state, that is, in a state in which control panel 5 is disposed at the rear of machine tool 1 and wiring 12 is connected between control panel 5 and processing modules 3, it is possible to lift up and convey. Accordingly, during conveyance, it is not necessary to disconnect or reconnect wiring 12. In addition, since it is possible to convey in a state in which control panel 5 is installed on movable stand 6 and positioned at the rear of machine tool 1, preparation for conveyance such as transferring only control panel 5 using the crane is not necessary. Therefore, conveyance preparation or the process after conveyance becomes very easy and it is possible to shorten the work time for all conveyance.

In addition, conveyance jig 8 has no fixing location other than where bracket 32 that is the fixing section is fastened on base 2. Therefore, it is very easy for an operator to handle with few man hours for attachment and detachment work with respect to conveyance jig 8. Specifically, since holding section 80 may not only dispose holding plate 33 or support plate 36 with respect to movable stand 6, labor such as fastening work is not necessary. In particular, holding plate 33 is provided with a gap between the horizontal members 21 and 22, and positioning is not necessary, therefore designing and processing are easy as well as attachment and detachment work being easy.

In addition, conveyance jig 8 bears a load at the rail 401 side via intermediate support plate 37, therefore a robust structure is no longer necessary and handling is easy for the operator without too much weight. Furthermore, since nut 322 is provided on bracket 32, it is possible to prevent loss of the bolts. Further, because such conveyance jig 8 is welded and assembled by he rectangular steel pipe and is welded with bracket 32 and holding plate 33, support plate 36, and intermediate support plate 37 at a predetermined location, it is possible to easily form without increasing costs. Further, even if there is a modification in the shape of movable stand 6, design modification of holding section 80 and formation thereof is easy.

An embodiment of the present invention is described above, but the present invention is not limited thereto, and various modifications are possible within a range which does not depart from the gist of the present invention. For example, in the embodiment, holding section 80 of conveyance jig 8 is configured to lift up movable stand 6 from below, but vertical member 35 may be fixed above support beam 31, and a top plate section of movable stand 6, that is, a lower face part of control panel 5 may be lifted up. In addition, as described above, holding section 80 is modifiable according to a difference of configuration on the control panel 5 side of the embodiment, but is modifiable to the same configuration on the bracket 32 side that is the fixing section.

REFERENCE SIGNS LIST

1: MACHINE TOOL, 2: BASE, 3: PROCESSING MODULE, 5: CONTROL PANEL, 6: MOVABLE T STAND, 8: CONVEYANCE JIG, 12: WIRING, 25: CASTER, 31: SUPPORT BEAM, 32: BRACKET, 33: HOLDING PLATE, 36: SUPPORT PLATE, 37: INTERMEDIATE SUPPORT PLATE, 80: HOLDING SECTION, 401: RAIL, 801, 802: JIG MEMBER

The invention claimed is:

1. An assembly comprising:
   a base of a machine tool;
   a control panel of the machine tool, the control panel being installed on a movable stand with casters and disposed separately from a main body of the machine tool; and
   a conveyance jig,
   wherein the conveyance jig includes
      a fixing section configured to fix the conveyance jig to the base of the machine tool, and
      a holding section configured to hold the control panel of the machine tool,
   wherein the holding section holds the control panel at a position to a rear of the base of the machine tool while loaded on the movable stand, and
   wherein the fixing section is a plate-shaped bracket including:
      multiple through-holes to which bolts are fastened in order to fix the conveyance jig to the base of the machine tool, and
      multiple female threaded sections that are separate to the multiple through-holes and to which the bolts are attached so as to store the bolts when the bolts are not being used to fix the conveyance jig to the base of the machine tool.

2. The assembly according to claim 1,
   wherein the holding section includes:
      a lower holding plate that abuts against the movable stand from a lower side,
      a front holding plate that abuts against the movable stand from a front side, and
      a rear holding plate that abuts against the movable stand from a rear side.

3. The assembly according to claim 1,
   wherein the conveyance jig further comprises an intermediate support section that causes a load to act on the base between an attachable and detachable section and the holding section.

* * * * *